United States Patent
Odean et al.

(10) Patent No.: US 8,988,716 B1
(45) Date of Patent: Mar. 24, 2015

(54) CUSTOMIZED PRINTER IDENTIFIER WITH EMBEDDED ACCESS RIGHTS

(71) Applicant: Google Inc., Mountain View, CA (US)

(72) Inventors: Tyler Odean, San Francisco, CA (US); Yevgeniy Gutnik, Cupertino, CA (US); Albert Bodenhamer, San Jose, CA (US); Sanjeev Radhakrishnan, San Jose, CA (US); Abhijit Kalamkar, Sunnyvale, CA (US); Yuri Dolgov, Mountain View, CA (US); Paolo Ferraris, Mountain View, CA (US); Scott Byer, Cupertino, CA (US); Marc Pawliger, San Jose, CA (US); Robert Toscano, San Francisco, CA (US); Akshay Kannan, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/755,465

(22) Filed: Jan. 31, 2013

Related U.S. Application Data

(60) Provisional application No. 61/600,455, filed on Feb. 17, 2012.

(51) Int. Cl.
*G06F 3/12* (2006.01)
(52) U.S. Cl.
CPC .................................... *G06F 3/1238* (2013.01)
USPC ........................... 358/1.15; 358/1.9; 358/1.14
(58) Field of Classification Search
None
See application file for complete search history.

(56) References Cited

U.S. PATENT DOCUMENTS

| | | | |
|---|---|---|---|
| 5,828,864 A | 10/1998 | Danknick et al. | |
| 6,453,129 B1 | 9/2002 | Simpson et al. | |
| 7,092,119 B1 | 8/2006 | Hinds et al. | |
| 7,411,690 B2 | 8/2008 | Tsukada et al. | |
| 8,189,225 B1 * | 5/2012 | Lo et al. | 358/1.15 |
| 8,310,703 B2 * | 11/2012 | Nuggehalli et al. | 358/1.15 |
| 8,451,473 B2 * | 5/2013 | Hong et al. | 358/1.14 |
| 8,570,572 B2 * | 10/2013 | Shustef et al. | 358/1.15 |
| 8,593,677 B2 * | 11/2013 | Nishimi et al. | 358/1.15 |
| 8,599,402 B2 * | 12/2013 | Iwasaki | 358/1.14 |
| 2004/0114175 A1 | 6/2004 | Cherry et al. | |
| 2004/0223186 A1 * | 11/2004 | Ito | 358/1.16 |

(Continued)

FOREIGN PATENT DOCUMENTS

EP 1465052 A2 10/2004
WO 2011115987 A2 9/2011

OTHER PUBLICATIONS

"Server Message Block", from Wikipedia, the free encyclopedia, Aug. 24, 2012, 9 pages.

(Continued)

*Primary Examiner* — Dung Tran
(74) *Attorney, Agent, or Firm* — Brake Hughes Bellermann LLP

(57) ABSTRACT

A print server may include an access rights manager configured to receive an access request for printer access rights. The print server may also include a customized printer identifier generator configured to generate a customized printer identifier, based on the access request, with the printer access rights associated therewith, and a print job router configured to provide printing in response to receipt of the customized printer identifier and in accordance with the printer access rights.

20 Claims, 7 Drawing Sheets

(56) References Cited

U.S. PATENT DOCUMENTS

| | | | |
|---|---|---|---|
| 2005/0158100 | A1 | 7/2005 | Yamaguchi |
| 2006/0095500 | A1 | 5/2006 | Kato |
| 2006/0158680 | A1 | 7/2006 | Fujinawa et al. |
| 2007/0086054 | A1 | 4/2007 | Ikeno |
| 2007/0159650 | A1 | 7/2007 | Takamatsu et al. |
| 2007/0253020 | A1 | 11/2007 | Hull et al. |
| 2008/0137121 | A1 | 6/2008 | Chrisop et al. |
| 2009/0276266 | A1 | 11/2009 | Nishiyama |
| 2010/0302579 | A1 | 12/2010 | Nuggehalli et al. |
| 2010/0309508 | A1 | 12/2010 | Kamath et al. |
| 2010/0328707 | A1 | 12/2010 | Miyake |
| 2011/0075164 | A1 | 3/2011 | Nordback |
| 2011/0085196 | A1* | 4/2011 | Liu et al. .................. 358/1.15 |
| 2011/0096354 | A1 | 4/2011 | Liu |
| 2011/0222104 | A1 | 9/2011 | Mohammad et al. |
| 2011/0235085 | A1 | 9/2011 | Jazayeri et al. |
| 2011/0242554 | A1 | 10/2011 | Farry et al. |
| 2011/0299110 | A1* | 12/2011 | Jazayeri et al. ........... 358/1.15 |
| 2012/0057193 | A1 | 3/2012 | Jazayeri |
| 2013/0083337 | A1* | 4/2013 | Tecu et al. ................ 358/1.13 |
| 2013/0222827 | A1* | 8/2013 | Watanabe ................. 358/1.13 |
| 2013/0226695 | A1* | 8/2013 | Tamari ..................... 705/14.49 |
| 2013/0242334 | A1* | 9/2013 | Ichida ...................... 358/1.14 |
| 2013/0321855 | A1* | 12/2013 | Bhatia ..................... 358/1.15 |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

"Internet Printing Protocol". from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

"Public-Key Cryptography", from Wikipedia, the free encyclopedia, Aug. 24, 2012, 12 pages.

* cited by examiner

CUSTOMIZED PRINTER IDENTIFIER WITH EMBEDDED ACCESS RIGHTS

CROSS REFERENCE TO RELATED APPLICATION

This application is a nonprovisional of, and claims priority to, U.S. Provisional Patent Application No. 61/600,455, filed on Feb. 17, 2012, entitled "CUSTOMIZED PRINTER IDENTIFIER WITH EMBEDDED ACCESS RIGHTS", the disclosure of which is hereby incorporated by reference in its entirety.

TECHNICAL FIELD

This description relates to remote printing.

BACKGROUND

The ability to print paper versions of documents and other content typically requires access to one or more printers based on a person's identity and/or inclusion within a class of users. For example, users may purchase, configure, and utilize a personal printer, e.g., for in-home use. In other examples, printers may be provided to employees or students of a business or school, e.g., by providing individual user accounts in conjunction with network access to printers. Further, various business models exist for providing consumers with printing functionality, e.g., copy shops often provide consumers with an ability to use in-store printers, for a fee.

In contrast, network access is often provided as a commodity service. For example, many retail establishments routinely provide free or fee-based Wi-Fi access. Such access thus provides a customer attraction, and may enhance revenue and provide other benefits.

However, it may be difficult to provide printing resources in a similar fashion, and in an efficient, practical manner, when using conventional technologies. For example, while it may be possible for a retail establishment to provide public printers, such public printers may be prone to abuse and over-use by the general public. Moreover, it is difficult or impossible for retail establishments and other would-be print providers to accurately track and monitor printer usage by individuals, in a way that would be acceptable for, or desirable by, the individuals.

SUMMARY

According to one general aspect, a print server may include instructions stored on a computer-readable medium and executable by at least one processor. The print server may include an access rights manager configured to cause the at least one processor to receive an access request for printer access rights, a customized printer identifier generator configured to cause the at least one processor to generate a customized printer identifier, based on the access request, with the printer access rights associated therewith, and a print job router configured to cause the at least one processor to provide printing in response to receipt of the customized printer identifier and in accordance with the printer access rights.

According to another general aspect, a method may include receiving an access request for printer access rights, generating a customized printer identifier, based on the access request, with the printer access rights associated therewith, and providing printing in response to receipt of the customized printer identifier and in accordance with the printer access rights.

According to another general aspect, a computer program product may be tangibly embodied on a computer-readable storage medium and may include executable code that, when executed, is configured to cause a data processing apparatus to receive an access request for printer access rights, generate a customized printer identifier, based on the access request, with the printer access rights associated therewith, and provide printing in response to receipt of the customized printer identifier and in accordance with the printer access rights.

The details of one or more implementations are set forth in the accompanying drawings and the description below. Other features will be apparent from the description and drawings, and from the claims.

DETAILED DESCRIPTION

Figure 1:
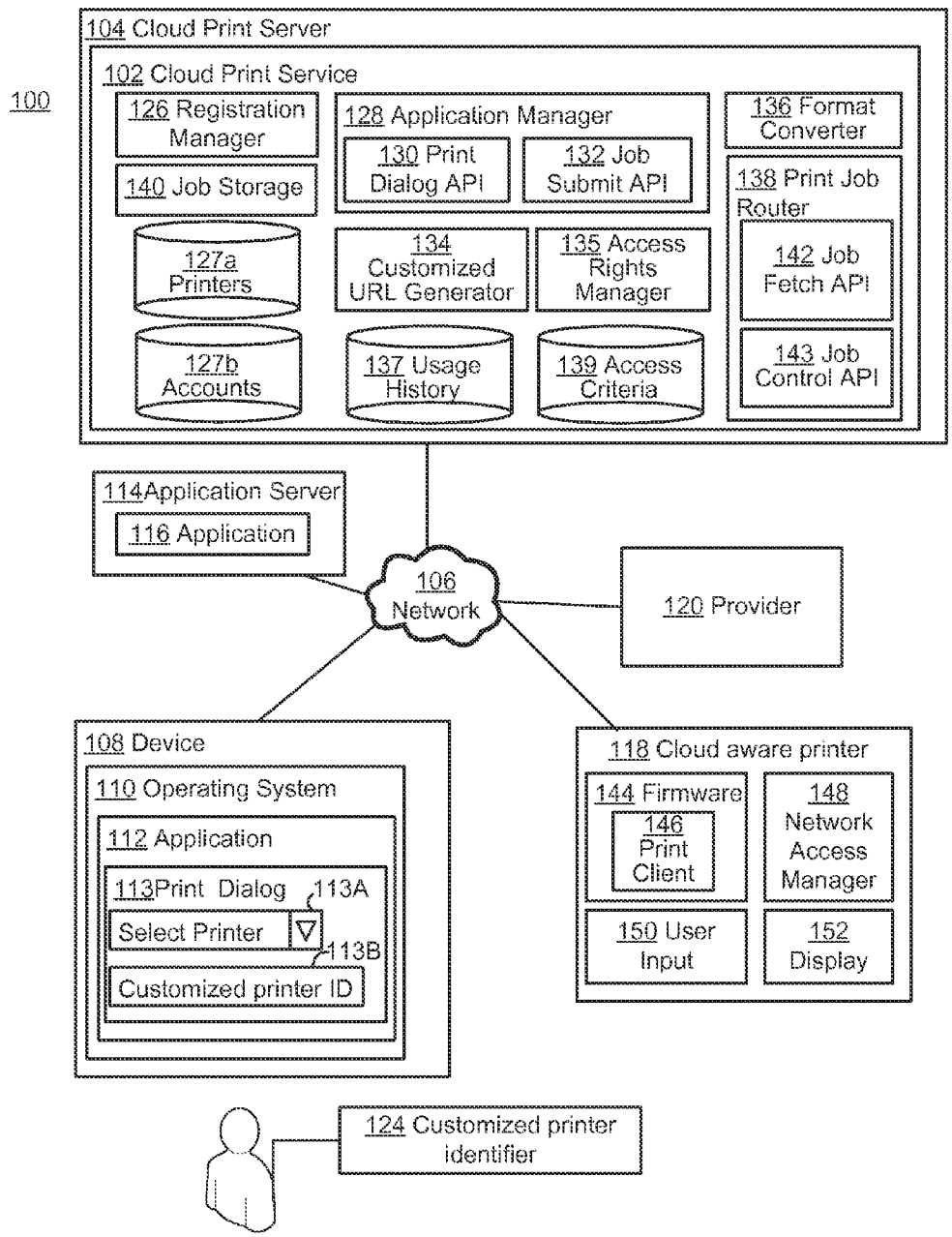
FIG. 1 is a block diagram of a system for implementing access rights management using a cloud print service.

FIG. 1 is a block diagram of a system 100 for implementing access rights management using a cloud print service 102. As shown in the example of FIG. 1, the cloud print service 102 may be executed on a cloud print server 104 which provides printing capabilities over a network 106. As described herein, the cloud print service 102 therefore provides a user with a uniform printing experience which is platform-independent and which unburdens the user of the need to configure, update, or otherwise maintain or oversee printer operations. Moreover, as also described herein in further detail, the cloud print service 102 provides techniques for providing printer access rights in a manner that is convenient for providers and consumers, and which enables accurate accounting of printer usage, without requiring identity information of the consumers. Various other features and advantages of the cloud print service 102 are described in detail below, and/or would be apparent.

In FIG. 1, a device 108 is illustrated as an example of virtually any computing device from which a user may wish to identify, designate, or submit a print job. By way of non-limiting example, then, the device 108 may include a laptop or desktop computer, a netbook, a tablet computer, a smartphone, a camera, or any device which may store or have access to data which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print, or combinations thereof.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner or other provider of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system 100 of FIG. 1.

The network 106 may thus represent, for example, the public Internet or other wide area public or private network. The network 106 may represent, in further examples, a corporate or other intranet, and/or a smaller-scale, local or personal network, any of which (and/or combinations thereof) may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 102 may make use of the cloud-aware printer 118, as described in detail, below.

For example, the cloud print service 102 may be configured to register the user and/or the device 108, as well as the cloud-aware printer 118. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 102 to the legacy printer. It will be appreciated that all of the various features and functions of the cloud-aware printer 118 may be obtained through the use of a legacy printer supplemented with appropriate hardware/software support.

In short, the system 100 provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In particular, as referenced above, the system 100 may provide a number of enhanced features and functions related to enabling a provider 120 to manage access rights of a user, illustrated in FIG. 1 as a user 125. For example, the provider 120 may be understood to represent any person, business, or other entity that wishes to provide printing as a commodity service for the use and enjoyment of the user 125. For example, as referenced above, the provider 120 may represent an owner/operator of a retail establishment, such as a coffee shop, who may wish to provide customers with an ability to utilize in-store printers. Thus, in the conceptualized example of FIG. 1, the provider 120 may represent an individual and/or a physical location (e.g., store) associated with providing printing as described herein.

In the examples described herein, the provider 120 may be described as representing a third party provider leveraging functionality of the cloud print service 102. However, in example implementations, the provider of the cloud print service 102 itself also may act as the provider 120.

As described in detail herein, the system 100 may be configured to provide users, such as the user 125, with convenient and (optionally) anonymous access to the cloud-aware printer. Moreover, the system 100 may provide an accounting of the printer usage of the user 125 over time. For example, the system 100 may be configured to determine to track a printing history of the user 125, add or subtract user print rights (e.g., with respect to available printers and/or quantity of printings permitted), and otherwise provide a printing experience that is convenient and enjoyable for the user 125, while beneficial for the provider 120.

In specific, non-limiting, example scenarios, the provider 120 may represent an owner of a retail establishment and may wish to provide access to the cloud-aware printer 118 as a customer reward service. For example, the provider 120 may provide printer access to the user 125 in exchange for a certain number or amount of purchases by the user 125. In this way, the user 125 may be incentivized to purchase goods/services from the provider 120.

For example, the provider 120 may be associated with a number of printers, perhaps at a number of different physical locations. Then, the user 125 may be provided with an ability to utilize all such printers, which may be extremely convenient and useful for the user 125. For example, the user 125 may represent a student who wishes to print a school paper, or an employee traveling for business who needs to print a report or presentation. Rather than travelling to a specialty print/copy shop, the user 125 may prefer to visit a branch/franchise of a coffee shop, convenience store, or other retail establishment utilizing the system 100, which may be closer, easier to find and visit, and otherwise more convenient (e.g., the user 125 may wish to visit the provider for its normal business purpose anyway, so that the ability to print is simply a value-added service to a visit the user 125 would have made in any case).

As shown in FIG. 1, the cloud print service 102 may include a number of example components or modules which may be utilized to implement functionalities of the cloud print service 102, and, in particular, may be utilized to implement the various printer access rights management scenarios described herein. For example, the cloud print service 102 may include a registration manager 126, which may be configured to register printers and users. Thus, it may be appreciated that, through the use of the registration manager 126, the provider 120 and/or the user 125 may register with the cloud print service 102, and may thereafter interact with the registration manager 126 to login to and utilize the cloud print service 102.

For example, the registration manager 126 may store a username and password of the user 125, which the user 125 may provide, e.g., in conjunction with a print job submission identifying application content to be printed (i.e., using the device 108). In example scenarios, the device 108 may represent a mobile device (e.g., a smartphone, tablet, netbook, notebook, or laptop computer), so that the user 125 may, in the example scenarios, use the same username/password to authenticate to the cloud print service 102 while present at the location of the provider 120 and/or the cloud-aware printer 118.

Somewhat similarly, the cloud-aware printer 118, as well as various other printers (not specifically illustrated in the example of FIG. 1), may be registered with the registration manager 126. In the described examples, it may be appreciated that a particular subset of such printers, including the cloud-aware printer 118, may be associated with the provider 120, and/or with one or more other providers (including entities such as business or schools). That is, the registration manager 126 may register a plurality of users and a plurality of printers, and may associate various subsets of users with various subsets of printers, depending on associated authorizations or permissions of the users/printers. For example, a given user may register a number of printers with a user account of the user. In other examples, a network administrator (e.g., employed by the provider 120) may configure a plurality of printers for use in the various access rights management scenarios described herein.

In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

Thus, it may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user 125 once the user 125 is logged on into the application 116.

Thus, in the example of FIG. 1, registered printers 127a and user accounts 127b are illustrated. Of course, the cloud-aware printer 118 and other printers associated with the provider 120 may be registered within the registered printers 127a. Further, the accounts 127b may include an account of the provider 120, which may thus be linked to, or associated with, the various registered printers just referenced. Further, as described in detail herein, the accounts 127b may include anonymous accounts individually associated with one or more users, perhaps anonymously, which may be used to provide the access rights management techniques described herein.

Further in FIG. 1, an application manager 128 may be configured to communicate with any application which may be desired to be used for printing within the system 100, including, e.g., the application 112, and the application 116. Thus, for example, the application manager 128 may implement various application programming interfaces (APIs) which enable such communication with external applications.

For example, the application manager 128 may include a print dialog API 130, which may be configured to render a print dialog 113 in association with the application 112. A job submit API 132 may be utilized to receive the identification of application content submitted by the user 125 by way of the print dialog 113. The job submit API 132 may be configured to submit a corresponding print job, including application content to be printed and associated print characteristics, to a format converter 136, which may be configured to execute a conversion of the print job into a format which is consistent and compatible with the cloud-aware printer 118. For example, the job submit API 132 may receive a print job, and, to give a specific and non-limiting set of examples, a hypertext transfer protocol (HTTP) multi-part request which may include the printer capabilities expressed, e.g., in XPS, as well as a MIME type identifying the content type.

Thus, the application manager 128 may generally implement the functions of receiving a print request, and then receiving an associated print job, from, e.g., the application 112, 116. In general, the first function of a receiving a print request may include providing the user 125 with the print dialog 113 or other user interface with which the user 125 may select an available/associated registered printer, and/or as described herein. Receiving the print job may include receiving print data to be printed, possibly along with print characteristics characterizing preferences and other aspects of how the print data is desired to be printed (e.g., color versus black and white, paper size orientation, number of copies, or any other relevant or desired print characteristic). The application manager 128 may conduct other communications with the application 112, 116, as well, such as, e.g., providing a status of the printer of a print job during the print job.

Thus, it may be appreciated that the application manager 128 may communicate with the application 112, 116 (or other application) in a format that is independent of a specific printer, e.g., that is generic with respect to all available or relevant printers within the system 100. In this way, the application 112, 116 may be relieved of some or all of the burdens associated with needing knowledge of the destination printer when formulating and/or sending a print job.

For example, when sending the print job, the application 112 may formulate both the print data and print characteristics in the same manner, regardless of whether the print job is destined for a particular identified printer, or is merely identified or associated with a generic, as yet undetermined, printer. In fact, even if the user 125 does not currently have any registered printer associated with his or her user account, the print job still may be forwarded to the cloud print service 102 for storage, and for later printing to the cloud-aware printer 118 or other printer that ultimately may be registered to the cloud print service 102 in conjunction with the account of the user 125, and at a time of arrival of the user 125 at such a printer at the second location 122.

Thus, it may be appreciated that the various APIs (e.g., 130, 132) utilized by the application manager 128 and/or the applications 112, 116 may represent lightweight, consistent, customizable, and easily implementable APIs which may be utilized in conjunction with a large number of various types of applications. Moreover, such APIs may rarely, if ever, need to be updated or maintained by the user 125 in order for the user 125 to utilize the cloud print service 102 in conjunction with a particular application. Instead, such updates may be managed by an administrator or other provider of a cloud print service 102 and/or by a provider of the application 112, so that the user 125 is unburdened of associated efforts and responsibilities.

As referenced above, such print jobs received at the application manager 128 in the printer-independent or generic format, which may be specifically or generically identified with one or more printers, may be passed to the format converter 136, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XML paper specification (XPF) provides such a fixed layout document, which is based on the eXtensible markup language (XML).

Thus, application content or other print data may be received from the application 112 in virtually any format, including, e.g., hypertext markup language (HTML), or in the format associated with document processing applications and/or images, or any PDF or XPF formats referenced above. The format converter 136 may thus be configured to receive print data in these and any other various formats, and to convert the print data into a format that is recognizable by a designated printer, e.g., that is recognizable by the cloud-aware printer 118 that is designated and identified by the user 125 upon the arrival of the user 125 at the second location.

Similarly, as referenced above, the format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. For example, a given printer may be a black and white printer with no two-sided printing abilities, while a second printer may be a color printer with two-sided printing. The format converter 136 may thus provide appropriate conversion, depending on a selected printer and/or on preferences of the user 125. The format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

As may be appreciated from the above description, the cloud print service 102 may include job storage 140 which may provide one or more types of data storage related to operations of the cloud print service 102. For example, the job storage 140 may store print jobs and related information, where such print jobs/information may be stored prior to and/or after the format conversions provided by the format converter 136. For example, a print job may be stored in a printer-independent format in which the print job may have been received by the job submit API 132.

In the example of FIG. 1, the job storage 140 may include a virtual print queue (not specifically illustrated) which is specifically configured to receive and store print jobs from the device 108 (or other device) and which are designated for roving printing at a time of submission of the print job, e.g., when the user 125 is not necessarily aware of a location or identify of the cloud-aware printer 118 when submitting the relevant print job. For example, the user 125 may utilize the print dialog 113 to select the such a virtual print queue, to thereby identify the associated print job within the job storage 140, so that the user 125 may retrieve the identified print job from the virtual print queue 140A upon arrival at the location of the provider 120.

Thus, for example, it may be observed that print jobs of the user 125 may be stored in conjunction with the associated user account of, or anonymous account associated with, the user 125, i.e., in the accounts 127b. As a result, print jobs may be committed to short term or long term storage, so that, for example, the user 125 may locate, identify, and re-print desired print jobs even if the user 125 later accesses the cloud print service 102 from a different location and/or using a different device than the device 108.

Further, it may be observed that conversion of the print job at least partially occurs at separate devices from the one or more devices in which the originating application 112, 116 may itself be executing. In this way, for example, it is possible to formulate and submit a print job at least partially separately from a conversion of the print job into a printer-specific format, and to thereby divorce such conversion from an underlying operating system of the executing application, e.g., the operating system 110.

Further in the example of the cloud print service 102 of FIG. 1, a print job router 138 may be configured to route the converted print job from the format converter 136 and/or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, including the user 125, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job, e.g., a print job specified from within the virtual print queue 140A, or, in other embodiments, a next available print job for the cloud-aware printer 118.

The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

Thus, in example scenarios associated with implementing the system 100 of FIG. 1, it may occur that the user 125 arrives at a location of the provider 120 and wishes to use the cloud-aware printer 118. Then, the provider 120 may provide the user 125 with a customized printer identifier 124 for this purpose. For example, as described in detail below, the provider 120 may provide the customized printer identifier 124 as part of a purchase receipt given to the user 125 in conjunction with consummating a business transaction/sale.

The cloud print service 102 may provide the customized printer identifier 124, and thereafter utilize the customized printer identifier 124 to track printer usages of the user 125 and otherwise manage printer access rights of the user 125. For example, the cloud print service 102 may create an anonymous account within the accounts 127b which is uniquely identified with the customized printer identifier (but not with the user 125 as such), and which is thereafter used to provide an monitor printer access.

For example, the printers 127a may be stored as, e.g., identified using, a collection of Uniform Resource Locators (URLs) which are each uniquely identified with an individual printer registered with the cloud print service 102. Then, the cloud print service 102 may include a customized URL generator 134 which is configured to generate a modified or enhanced version of the URL associated with the cloud-aware printer 118, for use as the customized printer identifier 124 provided to the user 125. The resulting customized URL may have access rights embedded therein, or otherwise associated therewith. In this way, multiple users 125 may be provided with access to the same cloud-aware printer 118, in a manner that is nonetheless individualized for each user.

Thereafter, an access rights manager 135 may be configured to provide printer access to the user 125, based on the usage of the customized printer identifier 124 by the user 125. For example, the access rights manager 135 may store and track a usage history 137 which records a number of print jobs submitted, a number of sheets of paper that have been printed, and an identity of the cloud-aware printer 118 or other printers which have been used in conjunction with the customized printer identifier 124. In this regard, although the usage history 137 is illustrated separately from the accounts 127b, it may be appreciated that such illustration is merely for clarity of explanation, and that in example implementations, the accounts 127b may be used to store the usage history directly.

In implementations of the system 100, the provider 120 may have various different criteria for assigning or otherwise providing printer access rights. Such criteria are illustrated in FIG. 1 as access criteria 139. For example, as referenced above and described in detail below, the provider 120 may wish to provide printer access as part of a customer reward program, and may therefore define the access criteria 139 such that customers who make a larger number of purchases, more frequent purchases, and/or more high-value purchases, are provided with a greater amount of printer access rights.

For example, the user 125 may enter a retail establishment and make a large individual purchase. At the time of sale, the provider 120 may utilize the access criteria 139 to define a quantity and quality of printer access to be afforded to the user 125 based on the purchase, and the customized URL generator 134 may generate the customized printer identifier 124 which the provider 120 may then print on a receipt for the transaction.

Then, the user 125 may utilize the device 108 to access the application 112 or 116, and may use the print dialog 113 to utilize the customized printer identifier 124. Specifically, as shown, when prompted to select a printer by field (e.g., drop-down list) 113A, the user may enter or otherwise select the customized printer identifier in a field 113B. Then, the access rights manager 135 may receive the customized printer identifier 124, identify the cloud-aware printer 118 as being associated therewith, and check the accounts 127b, the usage history 137, and/or the access criteria 139 in order to determine whether a requested print job submitted by the user 125 is currently allowed. Additional and alternative examples of implementations of the cloud print service 102 for providing printer access rights management are provided in more detail, below, or would be apparent.

In some such various example implementations, the cloud-aware printer 118 may utilize various hardware/software components during normal printing operations, and/or in conjunction with operations of the customized URL generator 134 access rights manager 135. For example, during execution, the printer job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced herein.

More specifically, the print client 146 may be configured to register the cloud-aware printer 118 with the cloud print service 102, and to thereby associate the thus-registered printer 118 with the provider 120. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, user input 150, and a display (or other user output) 152, which may generally represent otherwise-conventional components that are therefore not described here in detail except as may be needed to assist in understanding example operations of the system 100. Of course, the cloud-aware printer 118 need not include all of the components 144-152, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118. Similarly, the display 152 may represent virtually any sort of audio and/or video display to output information to the user 125 or other user of the cloud-aware printer 118.

Thus, as described herein and/or as may be appreciated, the various features and functions of the cloud-aware printer 118, and other features and functions not specifically illustrated, may be utilized in conjunction with operations of the customized URL generator 134 and the access rights manager 135. For example, the display 152 may be used to provide the customized printer identifier 124, and/or a current level of access rights (e.g., remaining number of sheets that may be printed) associated therewith. Similarly, the user input 150 may be used to enter the customized printer identifier 124, identify a print job for printing, and/or purchase additional printer access rights, among other uses.

Thus, it will be appreciated that many other configurations of the cloud-aware printer 118 or other printers are contemplated for use in conjunction with the system 100. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver communicating with the legacy printer in question. Other variations and implementations of the printer 118 or related printers would be apparent, and are not described here in detail, except as may be necessary or helpful in understanding operations of the system 100 of FIG. 1

Figure 2:
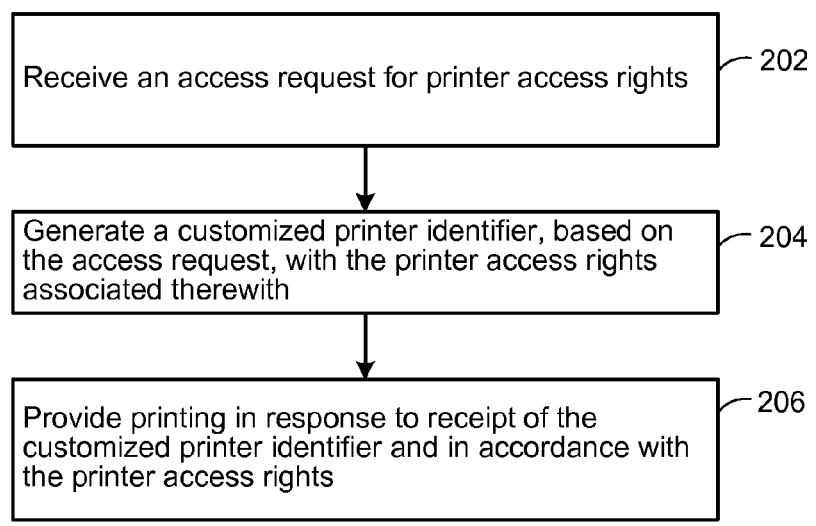
FIG. 2 is a flowchart illustrating example operations of the system of FIG. 1.

FIG. 2 is a flowchart 200 illustrating example operations 200-203 of the system of FIG. 1. Although the flowchart of FIG. 2 illustrates sequential, separate operations, it will be appreciated that such operations are merely for the sake of example, and that additional or alternative operations may be included. For example, operations of the flowchart 200 may be executed in different orders than that shown, and/or may be executed in partially overlapping or parallel manners, or in a nested, iterative, or looped fashion. Further, additional or alternative operations may be included, and/or one or more operations may be omitted In the example of FIG. 2, an access request for printer access rights may be received (202). For example, the access rights manager 135 may receive an access request from the provider 120 for printer access rights to be provided to a third party, e.g., to a consumer or other recipient of printing privileges. In other example implementations, the provider 120 or other requestor of printer access rights may desire such printing access for its own use or enjoyment.

A customized printer identifier may be generated, based on the access request, with the printer access rights associated therewith (204). For example, the customized URL generator 134 may utilize a URL associated with the cloud aware printer 118, as determined from the database 127A of printers, and may thereafter modify or enhance the retrieved URL with access rights specific to the received access request, as determined in conjunction with use of the access criteria 139.

Printing may be provided in response to receipt of the customized printer identifier and in accordance with the printer access rights (206). For example, the print job router 138 may be configured to utilize the usage history 137 in conjunction with one or more present or future print requests, and relative to the original or updated access rights provided by way of the customized printer identifier. As referenced above, and as described below, the courts may be utilized to track the usage history 137 in conjunction with the customized printer identifier, so as to thereby provide accurate access accounting, in a manner which may be conducted anonymously.

Figure 3:
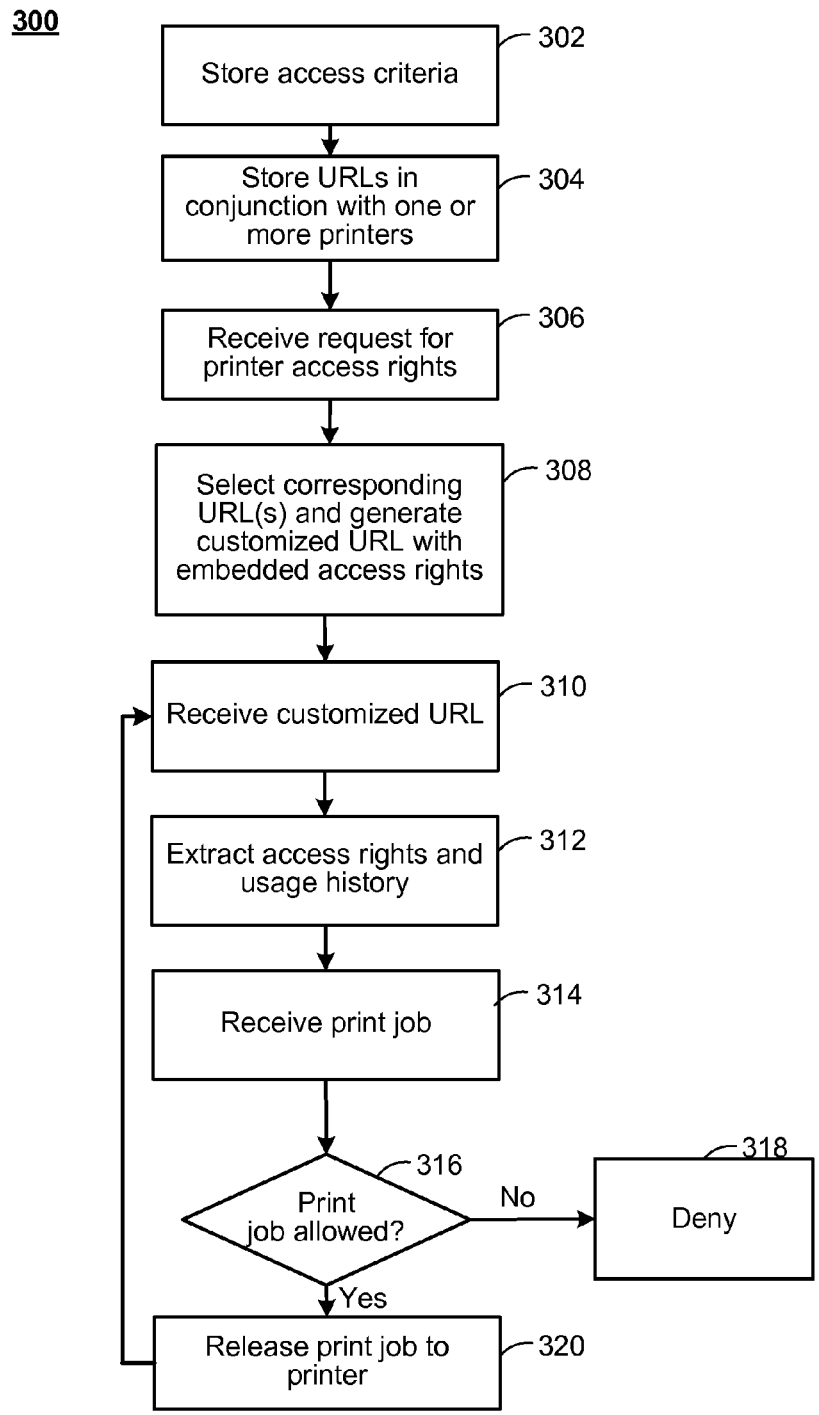
FIG. 3 is a flowchart illustrating more detailed examples of implementations of a cloud print service of FIG. 1.

FIG. 3 illustrates a flowchart 300 providing more detailed example implementations of the system 100 of FIG. 1. In the example of FIG. 3, access criteria 139 may be defined and stored (302). For example, an owner or operator of the cloud print service 102 may initially define levels and types of access which may be provided, with respect to one or more providers 120 and/or with respect to one or more users or classes of users 125. Additionally, or alternatively, the provider 120 may submit desired access criteria 139 to the owner/operator of the cloud print service 102, for future use in determining levels and types of printer access rights to be provided.

For example, the provider 120, as referenced above, may represent a retail establishment or other business or entity which wishes to provide printing privileges for the use and enjoyment of its customers or other users. Consequently, such business or other entities may have vastly different criteria for providing such printer privileges. For example, the first business may wish to provide various levels of printing privileges in conjunction with additional purchases of goods or services. In other example implementations, the provider 120 may wish to implement the providing of printer access rights in conjunction with a customer loyalty or rewards program. In still other additional or alternative embodiments, it may occur that the provider 120 may wish to provide a certain minimum level of printing privileges which expire and/or renew in the context of certain defined time periods and/or quantity of print jobs, without necessarily being correlated with purchases of goods or services.

Consequently, it may be appreciated that many different scenarios may be implemented for defining and implementing the access criteria 139. Moreover, such scenarios may be highly configurable, and may easily be individualized in a manner that is desired by the provider 120 or other users of the system 100 with access and/or administrative rights provided with respect to the access criteria 139.

URLs may be stored in conjunction with one or more printers (304). For example, as illustrated and described above, printers 127A may represent URLs which define a network location of printers such as the cloud aware printer 118. As referenced above, during normal operations of the cloud print service 102, users may identify specific printers to be utilized in conjunction with such URLs. For example, in a simple scenario in which the cloud aware printer 118 represents a home printer of the user 125, the user 125 may simply select the printer 118 using the print dialog 113, and the print job router 138 may thereafter utilize the corresponding URL stored in the printer's database 127A to route the associated print job accordingly.

In the example of FIG. 3, and in the context of the examples described above with respect to the system 100 of FIG. 1, it may be appreciated that the provider 120 may store URLs for one or more printers to be owned and operated by the provider 120 in conjunction with the providing of commodity printing privileges. For example, an owner of many different branches or franchises of a retail establishment may purchase and install one or more printers at each such branch/franchise. In these and similar scenarios, the printers 127A may therefore store corresponding URLs which are individually associated with each such printer.

At a subsequent time, a specific access request for printer access rights may be received (306). For example, continuing the examples just referenced, a retail establishment may conduct a transaction, and may transmit a request for corresponding printer access rights to be granted in conjunction therewith. For example, as described below with respect to FIGS. 4A-4C, a point-of-sale transaction conducted at such a retail establishment may include a transmission of the access request from the retail establishment to the cloud print service 102, so that the corresponding printer access rights may be provided in conjunction with a receipt for the transaction. Further details associated with such example scenarios are described below, or would be apparent.

Thus, the access rights manager 135 may receive the access request and thereafter may consult the access criteria 139 in order to determine an appropriate level of printing privileges to be provided. For example, as referenced above, the access criteria 139 may specify that larger purchases are associated with greater printing privileges then relatively smaller purchases. In examples such as those referenced above in which the printing privileges are provided in conjunction with a customer loyalty or rewards program, access rights and associated printing privileges may be cumulative with respect to multiple purchases of the user 125 at one or more associated branches/franchises of the retail establishment.

Somewhat similarly, it may be appreciated from the above that the printing privileges to be extended may be provided with respect to one or more specific printers. For example, as referenced, the provider 120 may represent the retail establishment having multiple branches/franchises, any one of which may include two or more printers provided at a corresponding location. Consequently, the user 125 may be provided with printing privileges at any two or more such printers.

Thus, the customized URL generator 134 may be configured to receive the access rights determined by the access rights manager 135 in conjunction with the access criteria 139, so as to thereby select corresponding URLs from the printers 127A for subsequent generation of a corresponding customized URL with embedded access rights (308). That is, as may be understood from the above description of the system 100 of FIG. 1, printers 127A may include a plurality of URLs which are uniquely associated with individual printers implemented in conjunction with the system 100. For example, continuing the above-described example scenarios, retail establishments of the provider 120 may be used to provide a plurality of printers, and each such printer may be uniquely identified in the context of the network 106 in conjunction with a corresponding URL. Thus, the customized URL generator 134 may be configured to utilize the stored printer URLs in conjunction with the access rights determined by the access rights manager 135, to thereby provide a customized printer URL as the customized printer identifier 124 to be provided to the user 125. Consequently, as described, one or more unique, individual printers may nonetheless be associated with a relatively large number of individual users or classes of users 125, so that the cloud print service 102 may thereby provide accurate accounting for the providing of printing privileges as a commodity.

Consequently, at a subsequent time, the customized URL may be received (310) in conjunction with a desired print job which is desired by the user 125. For example, the print job router 138 may receive the customized URL provided to the user 125 as the customized printer identifier 124.

For example, it may occur that the customized printer identifier 124 is associated with the single cloud aware printer 118. Consequently, the user 125 may utilize the device 108 in the application 112 to select a document for printing by way of the print dialog 113. Consequently, as described above with respect to FIG. 1, and illustrated in more detail below with respect to the specific examples of FIGS. 4A-4C, the user 125 may use the drop-down list 113a to select or otherwise identify the cloud aware printer 118, and may use the field 113b to provide the customized printer identifier 124, i.e., the customized URL.

It will be appreciated that many different techniques may be utilized in the context of the print dialog 113 for identifying the cloud aware printer 118 for use in printing. For example, the cloud aware printer 118 may be provided with a name or other identifier printed thereon, or provided by the provider 120 in conjunction with the customized printer identifier 124 (e.g., printed on the corresponding transaction receipt). In additional or alternative examples, a quick review (QR) code may be provided on the cloud aware printer 118, so that if the device 108 includes functionality for reading such QR codes, the cloud aware printer 118 may thus be identified accordingly. Of course, various other examples of appropriate technologies may be utilized for identifying the cloud aware printer 118 as such. For example, near field communication (NFC) techniques, Bluetooth techniques, Infra-red communications, and various other techniques and associated protocols, or combinations thereof, may be utilized.

In still other additional or alternative implementations, the user 125 may utilize the user input 150 and the display 152 of the cloud aware printer 118 itself in order to submit the customized printer identifier 124 and otherwise utilize provided printing privileges. In such cases, it may be appreciated that it may be unnecessary or less necessary for the user 125 to identify the cloud aware printer 118 as such. Since, for example, the print client 146 and the network access manager 148 of the cloud aware printer 118 may be configured to identify the cloud aware printer 118 to the cloud print service 102.

Upon receipt of the customized URL, the print job router 138 may communicate with the access rights manager 135, and/or the usage history 137 and access criteria 139, to thereby determine a current, corresponding level of printing privileges which are available to the user 125. For example, as described, an anonymous or non-anonymous account of the user 125 may be maintained in accounts 127b. Consequently, as also described, the usage history 137 may track usage of printing privileges by the user 125 over time, so as to thereby provide an accounting thereof with respect to original printing privileges provided to the user 125.

Thus, in the first instance after the initial providing of the customized printer identifier 124 to the user 125, the usage history 137 for the corresponding account may indicate that no usage of printing has occurred, so that provided access rights remain fully available to the user 125.

Consequently, a print job desired by the user 125 may be received (314). For example, the print dialog 113 may be utilized to submit a document of the application 112 to the application manager 128 for printing of the identified document in accordance with available access rights. In this regard, it may be appreciated that operations 310, 312, 314 are illustrated as separate, sequential operations, but, as referenced above with respect to FIG. 2, the operations 310-314 may occur in a partially or completely overlapping or parallel fashion. For example, the customized URL and print job may be received simultaneously by the application manager 128. Moreover, similarly, although the print job router 138 and the application manager 128 are illustrated as separate components in the example of FIG. 1, it may be appreciated that functionality of the print job router 138 associated with the extraction, analysis, and implementation of the corresponding access rights and usage history associated with the received customized URL may be implemented as part of, or in conjunction with, operations of the application manager 128, and/or as part of, or in conjunction with, operations of the access rights manager 135.

Thus, if the requested print job is not allowed (316) in conjunction with the corresponding access rights (316), then the requested printing may be denied (318). For example, if the user 125 has been provided with printing privileges associated with the printing of a certain number of pages, and the request print job exceeds the allowed number of pages, then the print request may be denied. In such scenarios, the user 125 may be provided with information as to why the denial occurred. Additionally, or alternatively, it may occur that the customized URL is generated in conjunction with a time to live (TTL), after which a validity or extent of the provided printing privileges may be reduced or invalidated entirely. For example, a time limit may be associated with the customized personal identifier 124, e.g., an hour, a day, or a number of days, after which the user 125 may no longer be able to utilize the particular customized printer identifier 124. Generally, multiple time limits may be provided, at each of which a corresponding extent of printing privileges may be reduced.

If, however, the print job is allowed (316) in accordance with available access rights, then the print job router 138 may relieve the requested print job to the printer 118 (320). Afterwards, it may occur that the customized URL may again be received (310). As a result, operations 310-320 may be provided in an iterative fashion, until the corresponding access rights and usage history indicate that corresponding printing privileges have been exhausted.

Of course, as also illustrated and described, existing access rights may be enhanced or supplemented at any time. For example, a supplemental access request may be received (306), so that the corresponding customized URL with embedded access rights may be correspondingly updated (308). In such scenarios, as may be appreciated, the accounts 127b may utilize longer running or more permanently stored account information which may be updated over time to reflect such increases in current or available printing privileges. For example, as referenced above, a provider 120 may provide printing privileges in association with customer loyalty or reward programs, so that the accounts 127B are updated in conjunction with each new purchase or other event/activity which results in increased printing privileges.

Figure 4A:
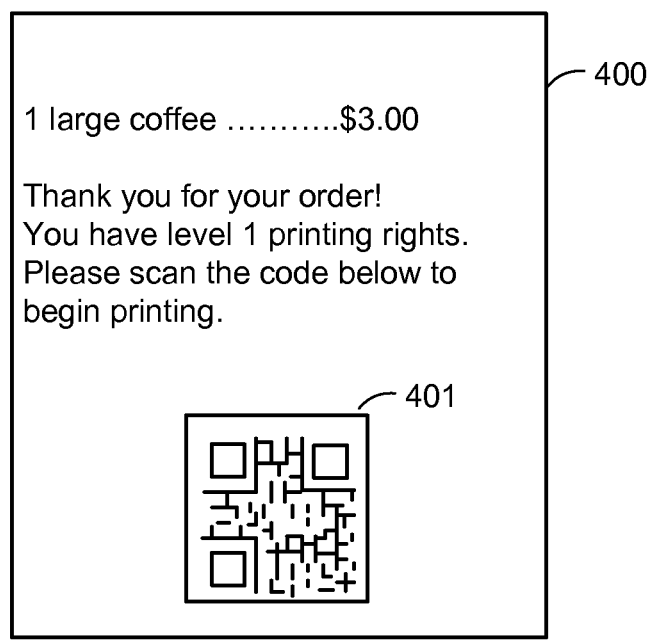
FIG. 4A illustrates an example receipt for providing a customized printer identifier with embedded access rights.
Figure 4B:
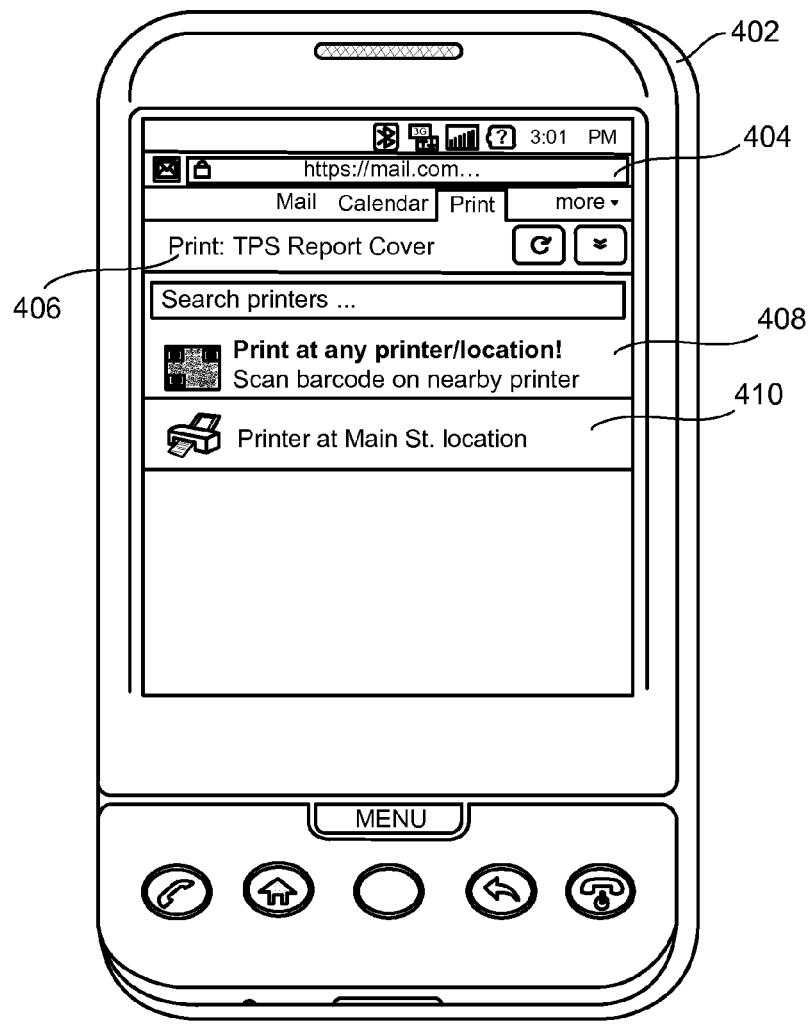
FIGS. 4B, 4C are screenshots illustrating examples of the operation of system of FIG. 1.
Figure 4C:
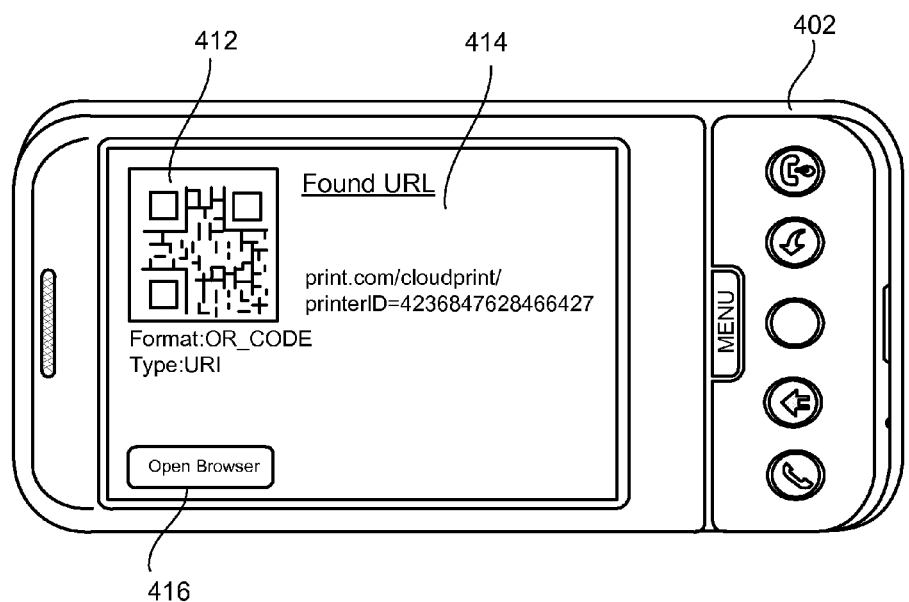

FIGS. 4A-4C illustrates an example implementation of the system 100 of FIG. 1 consistently with various ones of the examples provided above. More specifically, as shown and described, FIGS. 4A-4C illustrate an example implementation in which the provider 120 provides customized printer identifier 124 in conjunction with a point-of-sale transaction.

Consequently, FIG. 4A illustrates an example of a receipt 400 which may be provided to the user 125 in conjunction with connotation of such a point-of-sale transaction, such as, for example, purchase of coffee. In the example of FIG. 4A, the receipt 400 includes information provided to the user 125 which defines a level of printing privileges being provided (e.g., "you have level one printing rights,") as well as instructions on how to utilize a provided customized printer identifier 401 (e.g., "please scan the code below to begin printing").

Thus, as described above, the code 401 represents a QR code which identifies a corresponding, customized URL with embedded printing access rights. As a result, the user 125 may utilize corresponding functionality of the device 108 (such as may be present on a representative Smartphone, tablet, or other mobile computing device) to thereby scan the QR code 401 for transmission thereof to the cloud print service 102.

In the simplified example of FIGS. 4A-4C, it may occur that the corresponding printer access rights are provided only with respect to the single cloud aware printer 118. In such scenarios, it may not be necessary for the user 125 to further identify the cloud aware printer 118. However, as also described above, it may occur that the QR code 401 is provided with a plurality of printers provided by the provider 120. In such cases, it may occur that the user 125 may be further required to individually identify the cloud aware printer 118 from among the plurality of available printers. For example, as referenced above, the user 125 may be required to scan a separate QR code provided on the cloud aware printer 118 itself, or to otherwise enter a provide identification of the cloud aware printer 118.

Specifically, as shown in the example of FIG. 4B, the user 125 may utilize a mobile device 402 representing the device 108, to thereby access the cloud print service 102 as shown by a portion 404 of the illustrated screenshot and associated selection of a corresponding print tab. As further illustrated, a portion 406 demonstrates selection of a particular document for printing (e.g., "TTS Report Cover").

As further illustrated, the user 125 may perceive to select a desired printer for use in printing the identified document. As shown, a portion 408 provides the user 125 with an instruction to scan a QR code associated with a nearby printer, e.g., the cloud aware printer 118, while a portion 410 illustrates, for the sake of example, a separate printer which may be accessible to the user 125 in conjunction with a user account of the user 125 in an individual capacity. Thus, as shown and described, the user 125 may proceed to select the cloud aware printer 118 for printing of the document identified in section 406.

Specifically, as shown in the example of FIG. 4C, the user 125 may proceed to scan the QR code 401 on the receipt 400, and, optionally, a corresponding QR code of the cloud aware printer 118, the latter being illustrated as QR code 412 in the example of FIG. 4C. Thus, as shown in a portion 414, the mobile device 402 may be utilized to illustrate the customized URL associated with the desired print job and the cloud aware printer 118. Then, an "open browser" button 416 may be selected by the user 125 to open a browser or other display window illustrating the desired document to be printed, so that the user may proceed with printing thereof.

It may be appreciated that although the example of FIGS. 1-4C provide a number of illustrative implementations, many other embodiments may be implemented as well, not all of which are illustrated or described herein. For example, in scenarios in which the provider 120 provides printing privileges in conjunction with a customer loyalty or rewards program, the user 125 may be enabled to purchase printing privileges directly in conjunction therewith. The user 125 may be provided with a customer rewards card, and may update or increase a number of amount of printing privileges associated therewith in conjunction with a point-of-sale transaction conducted with the provider 120. Many other example implementations exist, and would be apparent to one of skill in the art.

Figure 5:
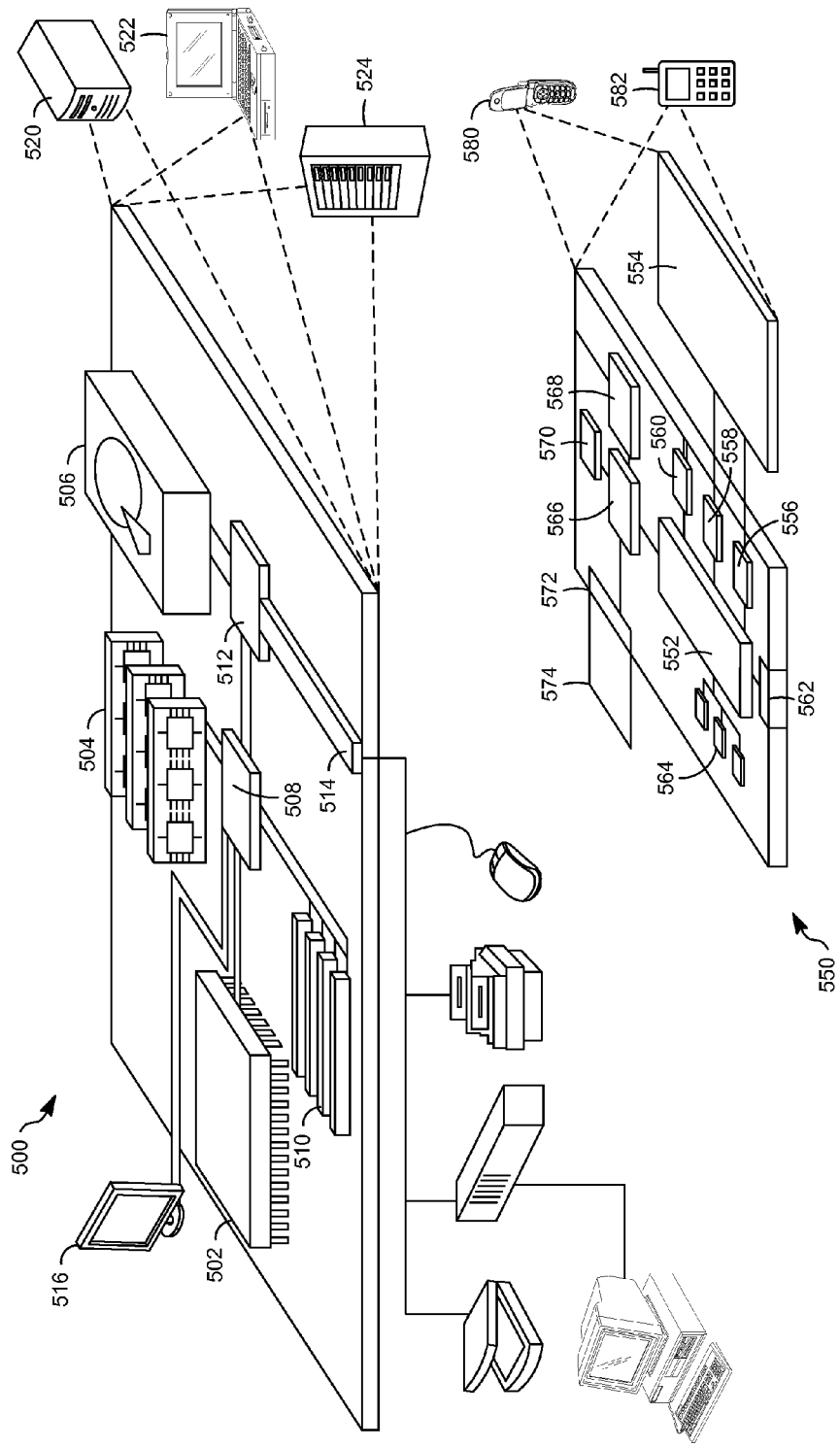
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server including instructions stored on a computer-readable medium and executable by at least one processor, the print server comprising:
    an access rights manager configured to cause the at least one processor to receive an access request for printer access rights from a printer provider providing at least one printer for printing;
    a customized printer identifier generator configured to cause the at least one processor to generate a customized printer identifier, based on the access request, with the printer access rights associated therewith, the customized printer identifier identifying the at least one printer and including printer access rights for a user to print using the at least one printer,
    the customized printer identifier configured to cause the at least one processor to transmit the customized printer identifier to the printer provider;
    an application manager configured to cause the at least one processor to receive a print job and the customized printer identifier from the user,
    the access rights manager configured to cause the at least one processor to determine whether the print job is allowed based on the customized printer identifier; and
    a print job router configured to cause the at least one processor to route the print job to the at least one printer for printing upon determining that the print job is allowed.

2. The print server of claim 1, wherein the application manager is configured to provide a print dialog to the user, the print dialog including a field configured to receive the customized printer identifier from the user.

3. The print server of claim 1, wherein the access rights manager is configured determine whether the print job is allowed by checking a usage history of printing associated with the customized printer identifier, and if the usage history indicates that access rights are still available, the access rights manager is configured to allow the print job to proceed.

4. The print server of claim 1, wherein the customized printer identifier generator is configured to utilize access criteria in conjunction with the access request to parameterize the printer access rights including an amount of printing to be associated with the customized printer identifier.

5. The print server of claim 1, wherein the customized printer identifier generator is configured to store a plurality of Uniform Resource Locators (URLs) identifying a plurality of printers including the at least one printer, and further configured to modify at least one of the URLs corresponding to the at least one printer with the printer access rights to thereby obtain the customized printer identifier, the customized printer identifier being a URL enhanced with the printer access rights.

6. The print server of claim 1, wherein the printer access rights are provided in conjunction with a user account associated with the user.

7. The print server of claim 1, wherein the access rights manager is configured to update a usage history of printing performed by the user, in conjunction with each printing, and further configured to update the printer access rights accordingly to reflect remaining access rights, if any.

8. The print server of claim 1, wherein the customized printer identifier is associated with a plurality of printers at which the printer access rights are valid and which are configured to provide the printing.

9. The print server of claim 8, wherein the print job router is configured to receive a selection of a printer of the plurality of printers to be used in providing the printing.

10. The print server of claim 1, wherein the access rights manager is configured to provide a current level of printing remaining to the user.

11. The print server of claim 1, wherein the customized printer identifier generator is configured to generate the customized printer identifier as a quick review (QR) code, and wherein the print job router is configured to receive the QR code from a mobile device of the user.

12. A method for providing printer access rights, the method being performed by at least one processor, the method comprising:
    receiving an access request for printer access rights from a printer provider providing at least one printer for printing;
    generating a customized printer identifier, based on the access request, with the printer access rights associated therewith, the customized printer identifier identifying the at least one printer and including printer access rights for a user to print using the at least one printer;
    transmitting the customized printer identifier to the printer provider;
    receiving a print job and the customized printer identifier from the user;
    determining whether the print job is allowed based on the customized printer identifier; and
    routing the print job to the at least one printer for printing upon determining that the print job is allowed.

13. The method of claim 12, further comprising:
providing a print dialog to the user, the print dialog including a field configured to receive the customized printer identifier from the user.

14. The method of claim 12, wherein generating the customized printer identifier comprises:
storing a plurality of Uniform Resource Locators (URLs) identifying a plurality of printers including the at least one printer; and
modifying at least one of the plurality of URLs corresponding to the at least one printer with the printer access rights to thereby obtain the customized printer identifier, the customized printer identifier being a URL enhanced with the printer access rights.

15. A computer program product tangibly embodied on a non-transitory computer-readable storage medium and includes executable code that, when executed, is configured to cause at least one processor to:
receive an access request for printer access rights from a printer provider providing at least one printer for printing;
generate a customized printer identifier, based on the access request, with the printer access rights associated therewith, the customized printer identifier identifying the at least one printer and including printer access rights for a user to print using the at least one printer;
transmit the customized printer identifier to the printer provider;
receive a print job and the customized printer identifier from the user;
determine whether the print job is allowed based on the customized printer identifier; and
route the print job to the at least one printer for printing upon determining that the print job is allowed.

16. The computer program product of claim 15, further comprising:
provide a print dialog to the user, the print dialog including a field configured to receive the customized printer identifier from the user.

17. The computer program product of claim 15, wherein a plurality of Uniform Resource Locators (URLs) identifying a plurality of printers including the at least one printer is stored, and wherein at least one of the plurality of URLs corresponding to the at least one printer is modified with the printer access rights to thereby obtain the customized printer identifier, the customized printer identifier being a URL enhanced with the printer access rights.

18. The computer program product of claim 15, wherein the executable code, when executed, are configured to update a usage history of printing performed by the user, in conjunction with each printing, and further configured to update the printer access rights accordingly to reflect remaining access rights, if any.

19. The computer program product of claim 15, wherein the executable code, when executed, are configured to provide a current level of printing remaining to the user.

20. The computer program product of claim 15, wherein the customized printer identifier is associated with a plurality of printers at which the printer access rights are valid and which are configured to provide the printing.

* * * * *